US008084992B2

(12) United States Patent
Scheffy et al.

(10) Patent No.: US 8,084,992 B2
(45) Date of Patent: Dec. 27, 2011

(54) TOOL STORAGE CABINET HAVING INTEGRATED POWER

(75) Inventors: Clark Scheffy, Cambridge, MA (US); Andy Deakin, San Francisco, CA (US); Sarah Madsen, San Francisco, CA (US); Joanne Oliver, San Francisco, CA (US)

(73) Assignee: Snap-On Incorporated, Kenosha, WI (US)

( * ) Notice: Subject to any disclaimer, the term of this patent is extended or adjusted under 35 U.S.C. 154(b) by 527 days.

(21) Appl. No.: 12/151,715

(22) Filed: May 8, 2008

(65) Prior Publication Data

US 2008/0278046 A1 Nov. 13, 2008

Related U.S. Application Data

(60) Provisional application No. 60/928,137, filed on May 8, 2007, provisional application No. 60/928,142, filed on May 8, 2007.

(51) Int. Cl.
*H02J 7/00* (2006.01)

(52) U.S. Cl. ...................... 320/114; 320/107; 312/223.1

(58) Field of Classification Search .................. 320/114, 320/107, 110; 312/194
See application file for complete search history.

(56) References Cited

U.S. PATENT DOCUMENTS 4,784,446 A 11/1988 Newhouse
4,938,548 A 7/1990 Richardson
4,989,291 A 2/1991 Parent
5,642,898 A 7/1997 Wise
6,012,788 A * 1/2000 Marschand et al. ....... 312/223.3
6,135,584 A 10/2000 Happ
6,218,796 B1 4/2001 Kozlowski
6,326,547 B1 * 12/2001 Saxby et al. .................... 174/69
6,336,691 B1 1/2002 Maroney et al.
6,493,217 B1 12/2002 Jenkins, Jr.
6,621,692 B1 * 9/2003 Johnson et al. .......... 361/679.55
6,722,673 B1 4/2004 Hamlin
6,726,164 B1 * 4/2004 Baiza et al. .............. 248/222.12
6,976,744 B2 12/2005 Hay et al.
7,054,696 B2 5/2006 Crowell (Continued)

OTHER PUBLICATIONS

International Preliminary Report on Patentability dated Nov. 18, 2010 of Applicants' corresponding PCT application.

*Primary Examiner* — Arun Williams
(74) *Attorney, Agent, or Firm* — Seyfarth Shaw LLP

(57) ABSTRACT

A tool storage unit is disclosed having a cabinet structure with a plurality of surfaces defining a first interior space and a storage compartment defining a second interior space, the compartment being configured to move between an open position extending from the first interior space and a closed position retracted within the first interior space. A stationary compartment sidewall fixed within the first interior space and adjacent the storage compartment limits access to the second interior space from the first interior space when the storage compartment is in the closed position. A plurality of power outlets positioned within the storage compartment such that each is accessible from the second interior space, and a locking feature for securing the storage compartment in the closed position are also featured. Finally, a recessed area integral to the top surface, a cover hinged to the top surface and covering the recessed area, and a power outlet positioned with the recessed area is a further feature of the disclosed storage unit. A power outlet positioned on the top surface of the cabinet structure outside of the recessed area may also be provided.

29 Claims, 12 Drawing Sheets

U.S. PATENT DOCUMENTS

| | | | | |
|---|---|---|---|---|
| 7,055,833 | B2 | 6/2006 | Wixted et al. | |
| 7,130,190 | B1 * | 10/2006 | Baker | 361/695 |
| 2003/0080655 | A1 * | 5/2003 | Goldberg | 312/290 |
| 2004/0026998 | A1 | 2/2004 | Henriott et al. | |
| 2005/0156560 | A1 * | 7/2005 | Shimaoka et al. | 320/107 |
| 2005/0156564 | A1 | 7/2005 | Krieger | |
| 2005/0205576 | A1 * | 9/2005 | Bednara et al. | 220/328 |
| 2005/0280228 | A1 | 12/2005 | Fernandes et al. | |
| 2006/0006838 | A1 | 1/2006 | Clarke | |
| 2006/0138005 | A1 * | 6/2006 | Guarino | 206/373 |
| 2007/0031099 | A1 * | 2/2007 | Herzog et al. | 385/135 |
| 2007/0085454 | A1 * | 4/2007 | Choi | 312/194 |
| 2007/0145700 | A1 | 6/2007 | Ambrose et al. | |
| 2007/0190921 | A1 * | 8/2007 | Heim et al. | 454/184 |
| 2007/0228680 | A1 | 10/2007 | Reppert et al. | |
| 2007/0249196 | A1 * | 10/2007 | Collins et al. | 439/152 |
| 2008/0121147 | A1 * | 5/2008 | Cooke et al. | 108/50.02 |

* cited by examiner

TOOL STORAGE CABINET HAVING INTEGRATED POWER

RELATED APPLICATIONS

The present application claims priority of U.S. Provisional Application Ser. Nos. 60/928,137 and 60/928,142, both filed May 8, 2007, the entire disclosures of which are hereby incorporated by reference.

TECHNICAL FIELD OF THE INVENTION

The present device relates to tool storage units. Particularly, the present device relates to a tool storage unit having integrated power to several locations, including a compartment for storing rechargeable tools and their corresponding charging units.

BACKGROUND OF THE INVENTION

Tool storage units have been traditionally used not only for storage of various hand and power tools, but also for securing such tools in a manner which prevents theft and/or misuse by an unauthorized user. Locking drawers, doors and roll tops on tool storage cabinets have typically been used to provide such security.

With the quickly growing market of cordless power tools (i.e., battery operated tools), storage units have begun to adapt by providing compartments specifically for these cordless devices and their battery charging units. However, stored cordless tools, particularly a battery for such tools after a previous day of use, can be at low power when removed from the cabinet the next day. Typically, the tool or battery has to be recharged for a period of time before beginning the ensuing day's use. Such charging time during work hours is time which might otherwise be spent using these tools for their intended purpose. Instead, the time is passed waiting for a proper charge to be achieved on the requisite batteries.

Alternatively, the charging units, tools and/or batteries could be left to charge outside the security of the locked storage unit, but this leaves the expensive components susceptible to theft and misuse by others. This is an undesirable alternative for many users working with cordless power tools at unsecured work-sites.

Another problem identified in prior art tool storage cabinets, is the availability of power. Not only have tool cabinets been traditionally used for storage of various hand and power tools, but they can also function as a work surface on which to perform various tasks involving such tools. Typically, the top surface of the storage unit is designed with various features to facilitate its use as a work surface, including for the support of, for example, diagnostic equipment. Pull out surfaces proximate to the top of the storage unit have also been provided in some designs where a smaller work surface is preferred.

While the quickly growing market of cordless power tools, as noted above, has minimized the use of some corded power tools, it has not eliminated the need for a convenient power source at a typical work area. In fact, it could be argued, given the limited operating capacity of battery operated tools, the need for a convenient power source is now greater than ever. Cordless devices require a charged battery for operation and, therefore, battery charging units are needed close by for jobs lasting longer than the typical battery charge. This is equally true for computers and computerized diagnostic equipment, which may be capable of battery operation for a limited time as well.

Further, some devices may just not be available or suitable in cordless form. Long extension cords and generators present additional problems when used in, for example, small work areas or the outdoors. Accordingly, for such devices a convenient power outlet is a must.

The present device solves these and other problems associated with prior art devices by providing both a designated compartment within a storage unit which offers storage security and power charging ability, and a storage unit which offers a work surface and a convenient power source for cordless and corded power tools.

SUMMARY OF THE INVENTION

There is disclosed herein an improved tool storage cabinet which avoids the disadvantages of prior devices while affording additional structural and operating advantages.

A tool storage unit is disclosed comprising a cabinet structure having a plurality of surfaces defining a first interior space, a storage compartment defining a second interior space and configured to move between an open position extending from the first interior space and a closed position retracted within the first interior space, a stationary compartment sidewall fixed within the first interior space and adjacent the storage compartment such that access to the second interior space from the first interior space is prevented when the storage compartment is in the closed position, a plurality of power outlets positioned within the storage compartment such that each is accessible from the second interior space, and a locking feature for securing the storage compartment in the closed position.

In a preferred embodiment, the storage drawer is a slidable drawer including a power cord coupled on one end to the plurality of power outlets and on another end to a power source, and a cable carrier for protecting the power cord within the cabinet as the storage compartment is moved between the open position and the closed position.

It is an aspect of the invention to provide at least one support shelf configured to hold battery powered tools, batteries for such power tools, charging devices for the batteries of such power tools, or any combination of these components.

In another embodiment, the present tool storage power drawer comprises wall panels, including a single sidewall panel affixed to each of a front, a rear and a bottom wall panel to thereby define an interior space. A plurality of power outlets positioned attached to at least one of the front, rear, bottom and sidewall panels are accessible from within the interior space, and a locking feature is used for securing the storage compartment in the closed position.

It is another aspect of the present tool storage unit to provide a cabinet structure having a plurality of side surfaces and a top surface to define an interior space, a recessed area integral to the top surface, a cover hinged to the top surface and covering the recessed area, a power outlet positioned with the recessed area, and a plurality of tool storage compartments positioned within the interior space of the cabinet structure. Such embodiment may further comprise a power outlet positioned on the top surface of the cabinet structure outside of the recessed area.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF PREFERRED EMBODIMENTS

Figure 1:
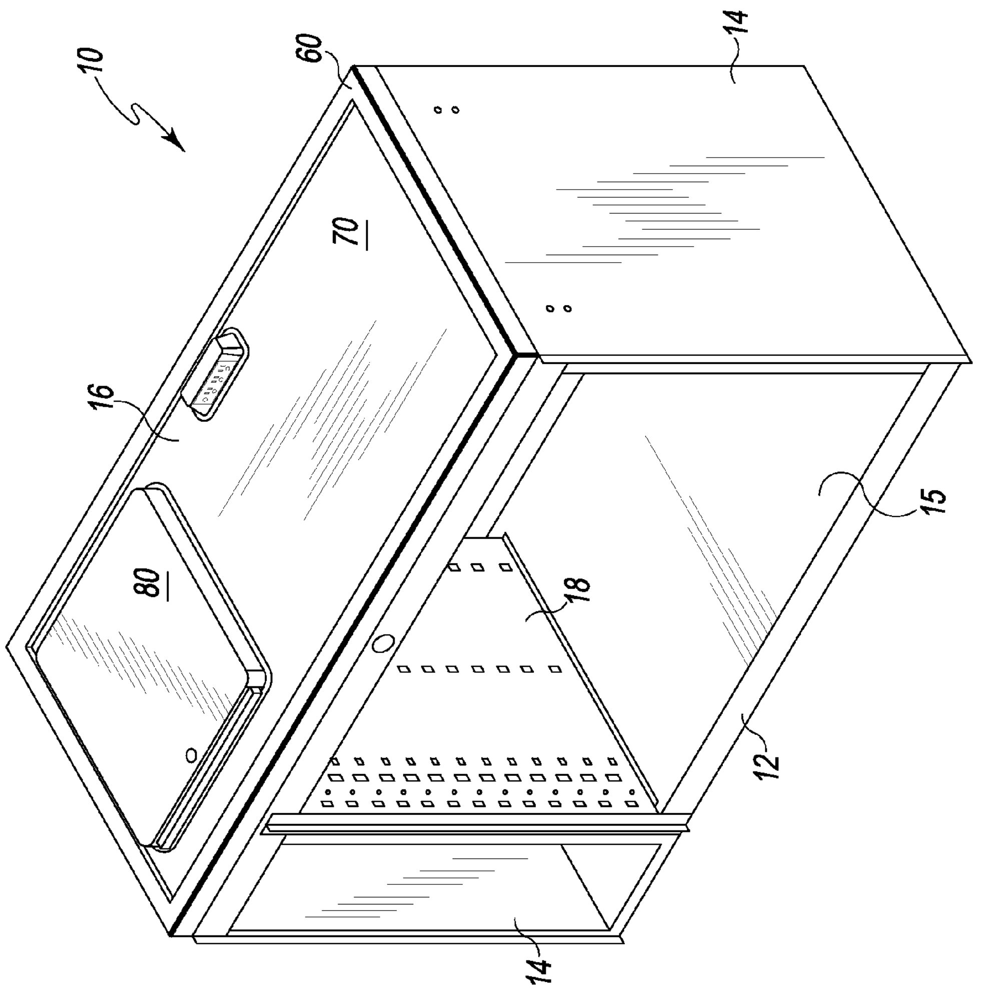
FIG. 1 is a perspective view of one embodiment of the present tool storage cabinet without tool drawers.
Figure 2:
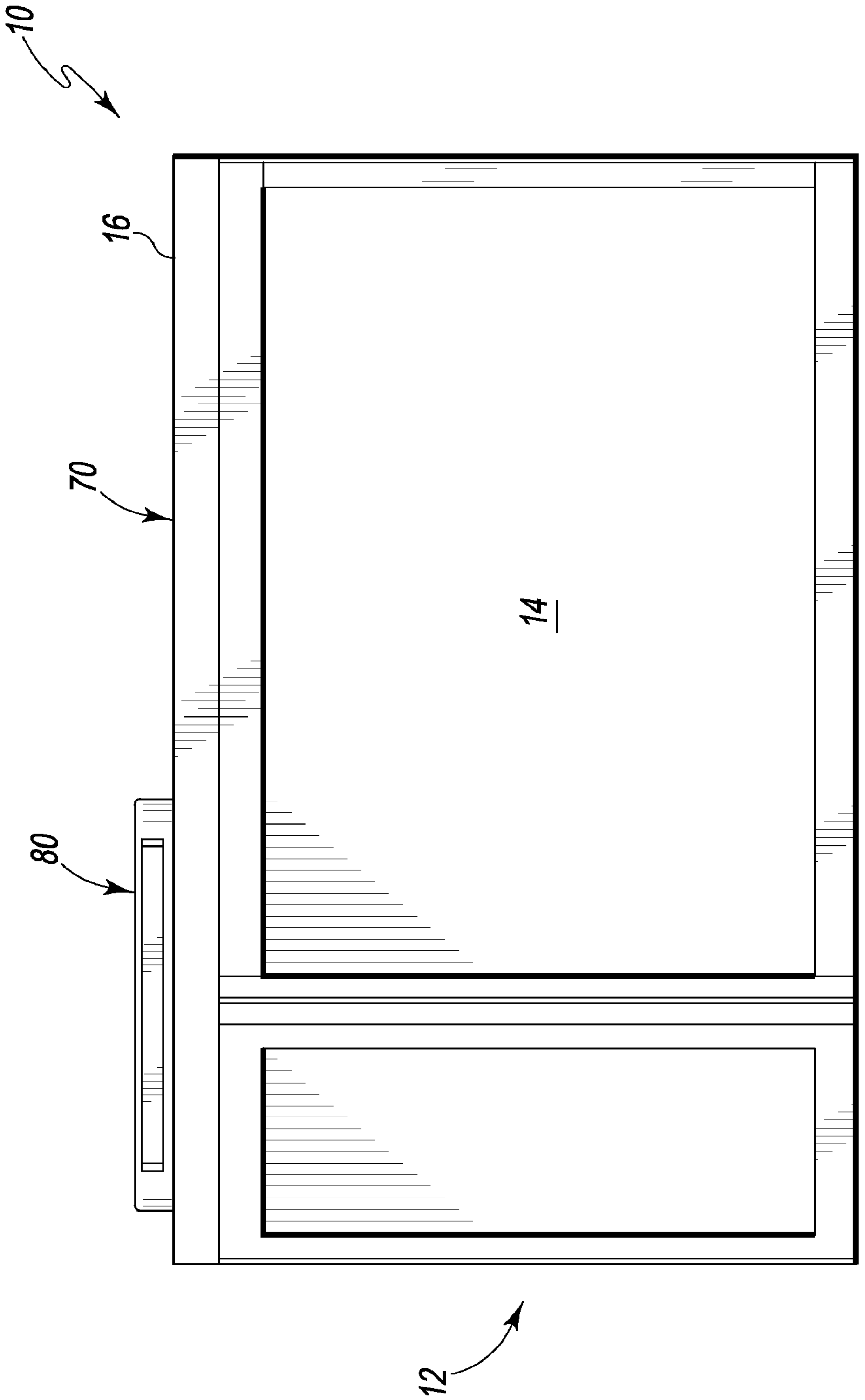
FIG. 2 is a front view of the tool storage cabinet shown in FIG. 1.
Figure 3:
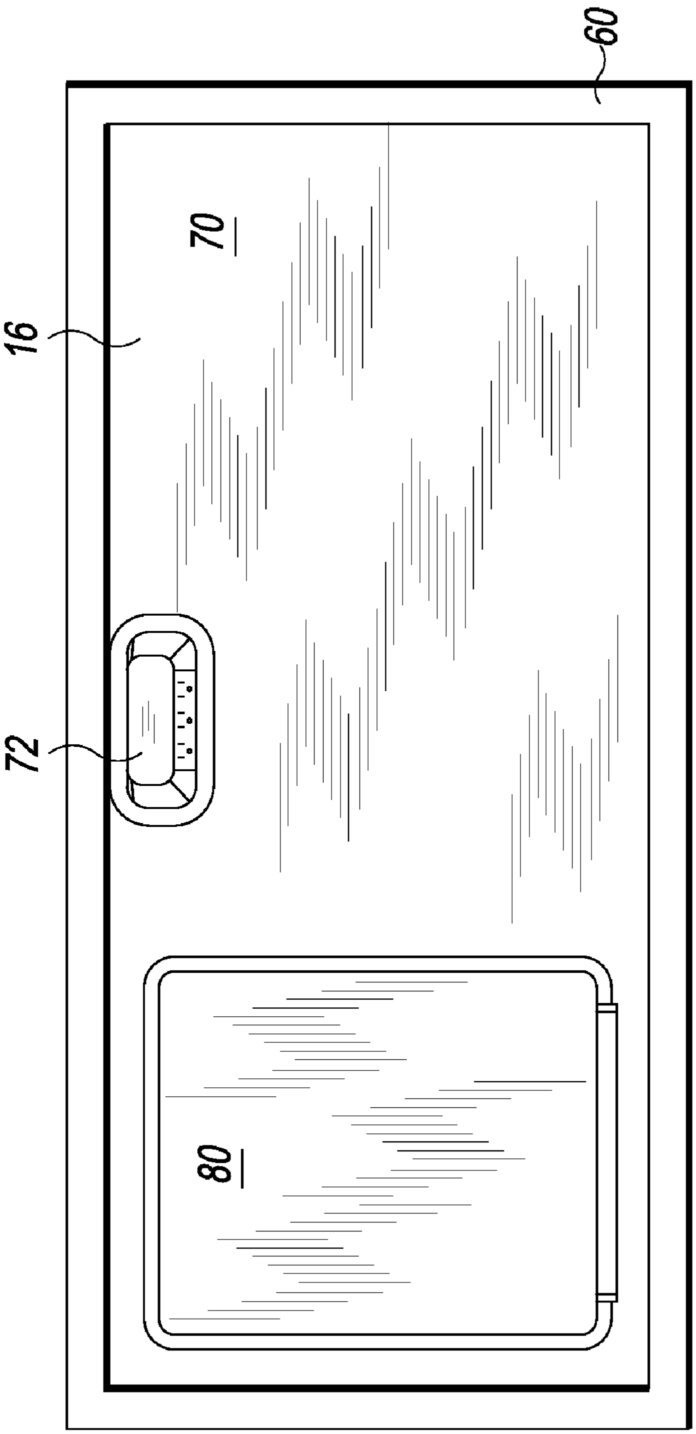
FIG. 3 is a top view of the tool storage cabinet shown in FIG. 1.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Referring to FIGS. 1-12, there is illustrated preferred embodiments of a tool storage cabinet or unit (e.g., a roll cab), generally designated by the numeral 10, and its various components. The disclosed tool storage cabinet 10 includes a support frame 12 typically closed by wall sections 14 on three sides and a bottom wall 15, leaving one side open for insertion of, for example, sliding drawers, and a top surface 16 which may be fixed or hinged for opening. The tool storage cabinet 10 may include a wheeled base attached at the bottom wall 15 for portability, as well as side and rear add-on components, all of which are well-known features of such tool storage cabinets. The tool storage cabinet 10 and its components, unless otherwise stated, are shown in FIGS. 1-12 in a basic configuration so as to best illustrate the claimed features of this application.

The claimed features of the present tool storage cabinet 10 include a power drawer 50 and a power surface 70 having a computer hatch 80. The power drawer 50, as will be discussed in greater detail below, is useful for charging cordless power tools during storage. The power surface 70 is similarly useful for charging batteries for cordless devices or for powering corded tools, as necessary. The integral computer hatch 80, also provided with a power outlet, is capable of powering and storing computer and diagnostic equipment from the top surface 16.

Referring first to FIGS. 1-9, the power drawer 50 is preferably a sliding drawer which is capable of movement between an open and closed condition. The drawer 50 is shown to be open on one side—facing the interior to the storage unit—and at the top. This configuration allows convenient access to the drawer interior when in the open condition. The drawer is positioned upright to provide greater vertical storage space. However, a horizontal drawer (not shown) would be an acceptable alternative configuration.

The existing walls of the drawer 50 are comprised of bottom wall 51, front wall panel 52, exterior sidewall panel 53, and back wall panel 54. The front wall panel 52 is designed with a drawer pull 57 and seals tight against the frame 12 of the storage unit 10 when the drawer 50 is closed. With the interior wall 18 of the storage unit 10 in place, access to the interior of the closed drawer 50 is restricted. The interior wall 18 also prevents other tools and debris from inadvertently entering the power drawer 50, a result which may interfere with the equipment charging process.

Figure 7:
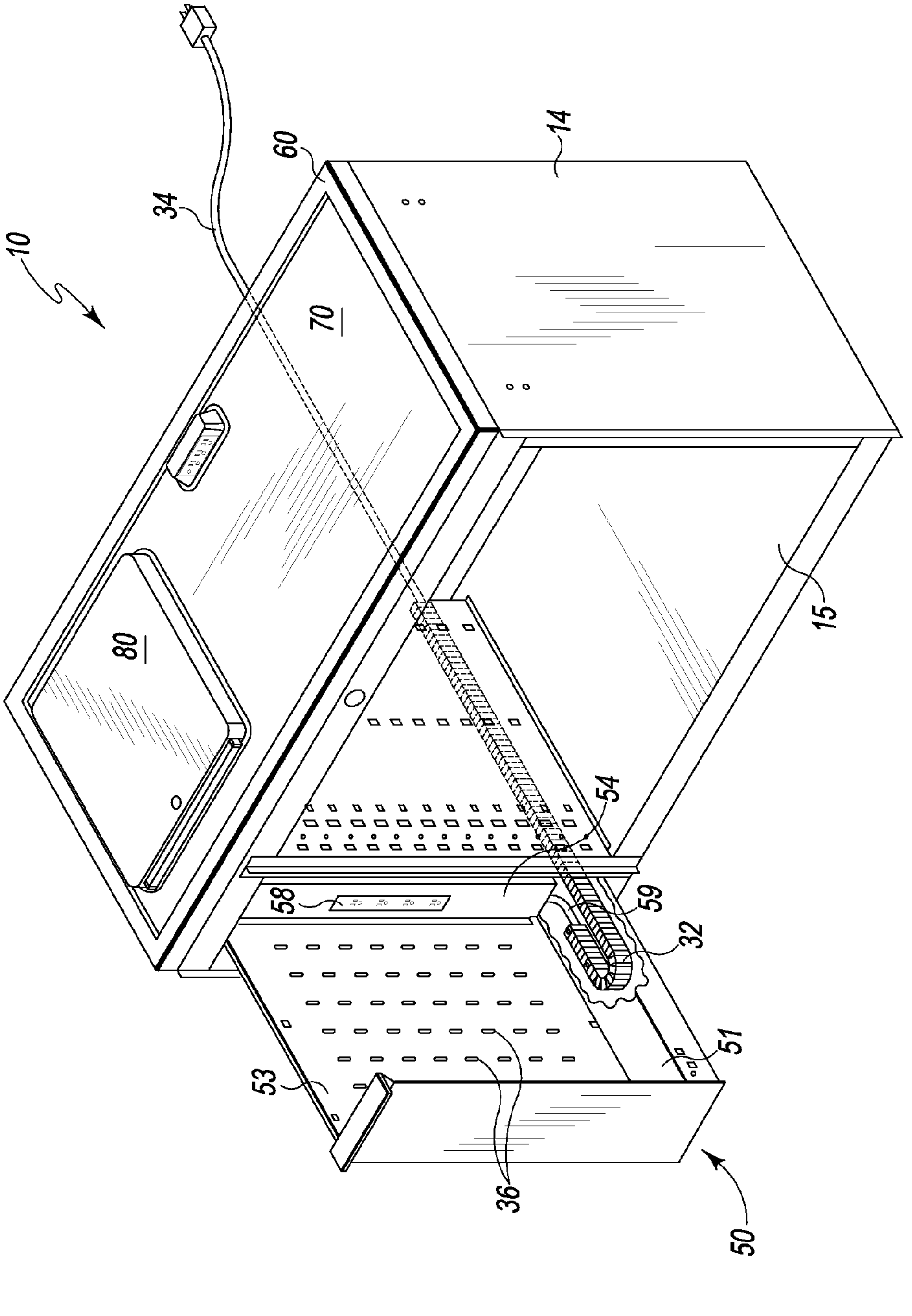
FIG. 7 is a perspective view similar to the embodiment shown in FIG. 4, including a cable housing suitable for use with the power drawer.

The bottom wall 51 is preferably spaced a distance from the bottom wall 15 of the storage unit 10 to thereby create a space, as illustrated in FIG. 7. Preferably, the back wall 54 of the power drawer 50 houses a four outlet power strip 58. The cord 59 of the power strip 58 is capable of being housed within the space created below bottom wall 51. A cable carrier 32 may be used to protect the integrity of the power strip power cord 59 as it is flexed repeatedly with the opening and closing of the power drawer 50. The other end of the power cord 59 may be connected directly into a breaker box, for example, either on the unit 10 or by extending the cord 59 through the wall 14 of the unit 10 to a designated power source (not shown).

Alternatively, the end of the power cord 59 may comprise a male plug for connecting to an external power source. Accordingly, an end of the cable carrier 32 would be preferably fixed at the wall 14 of the storage unit 10. Additional cord 34 could extend from the back wall of the storage unit 10 to allow it to be plugged into a power source, such as a wall outlet (not shown) or generator (not shown).

As noted, however, the power strip 58 may, of course, be secured to any of the power drawer 50 wall panels, including the bottom wall 51, to provide electrical power within the drawer interior. Several such power strips may be used, if necessary. Further, while commercial power strips are suitable, the outlet configuration (e.g., 1×6 strip, 2×3 strip, etc.) as well as the number of outlets provided, may vary for different intended uses. The power strip 58 may be fixed within or integral to the drawer wall or movable from a fixed anchor point. Such alterations are well within the ability of those skilled in the relevant art.

Figure 4:
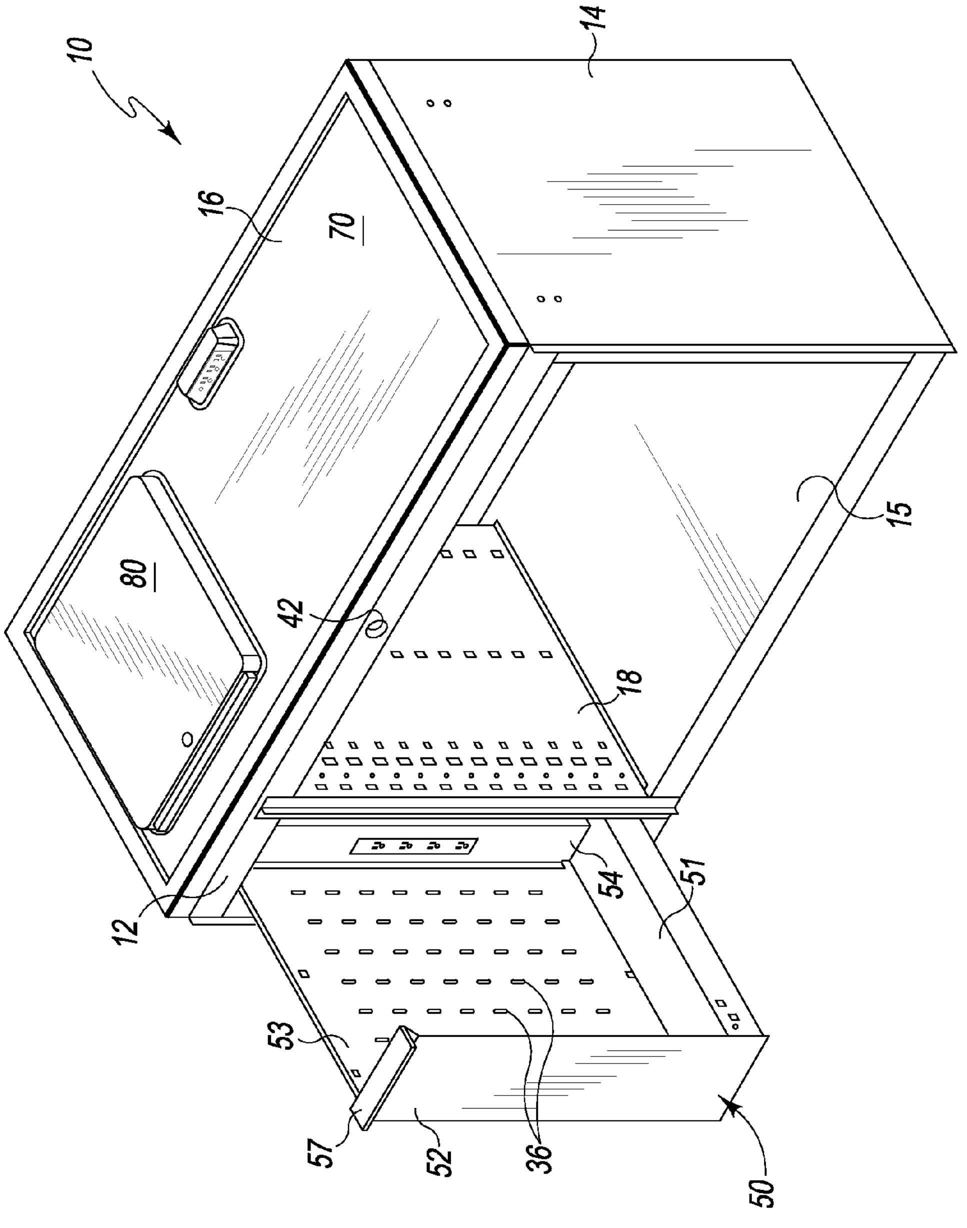
FIG. 4 is a perspective view similar to the embodiment of the tool storage cabinet shown in FIG. 1, including an embodiment of a power drawer in an open position.
Figure 5:
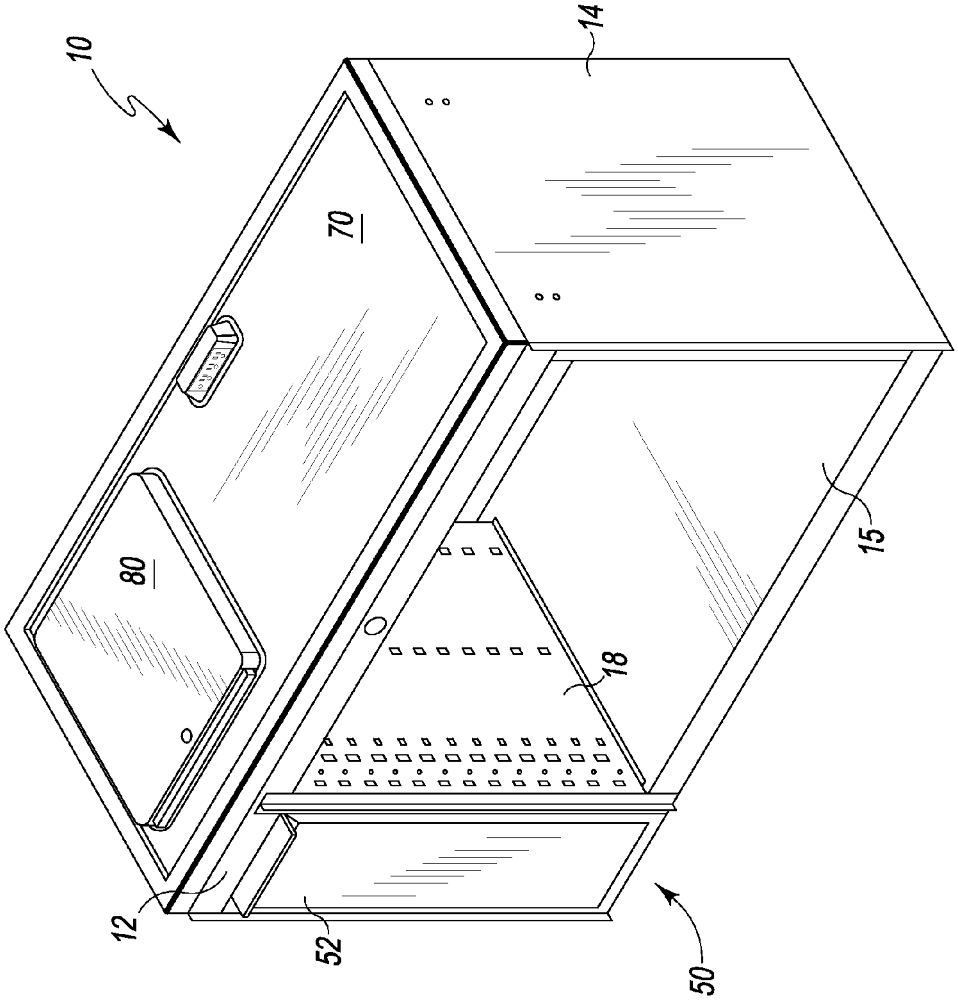
FIG. 5 is a perspective view of the tool storage cabinet shown in FIG. 4 with the power drawer in a closed position.
Figure 6:
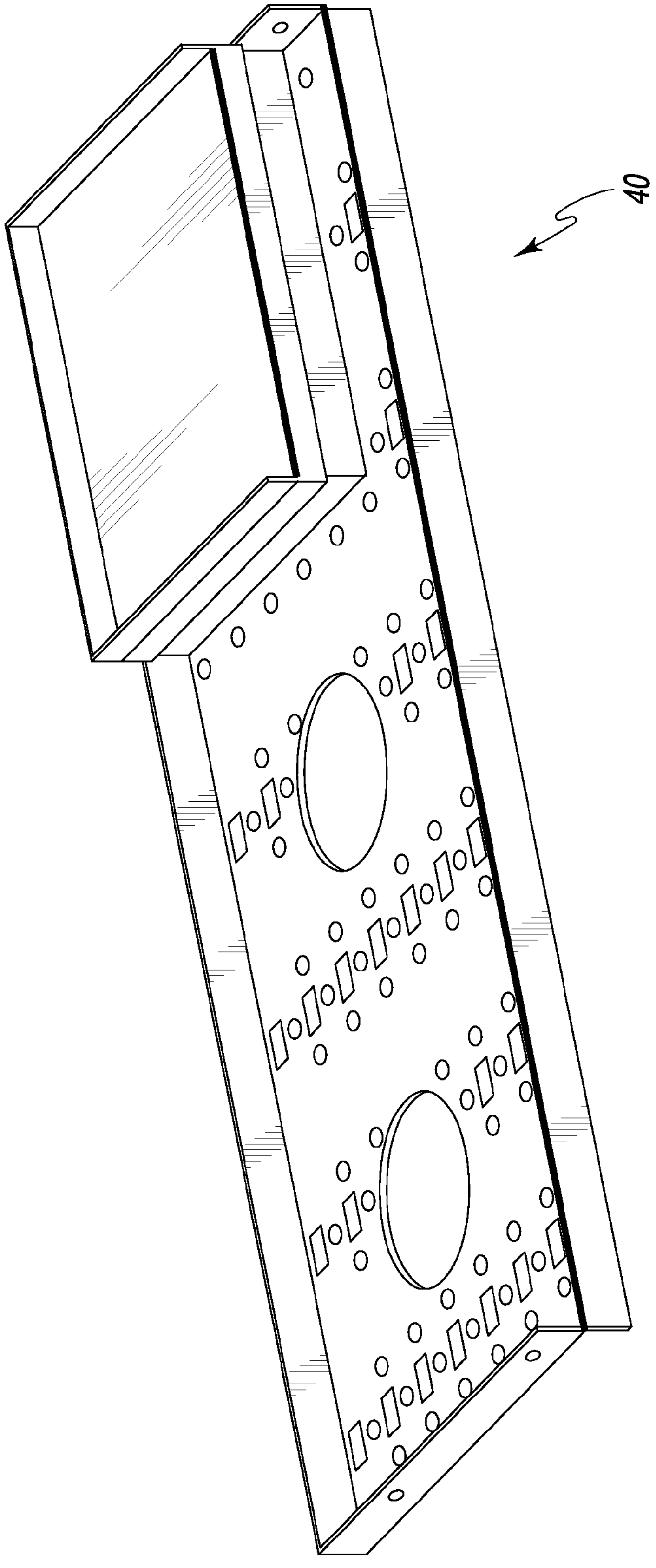
FIG. 6 is a perspective view of an embodiment of removable shelving compatible with the present tool storage cabinet.
Figure 8:
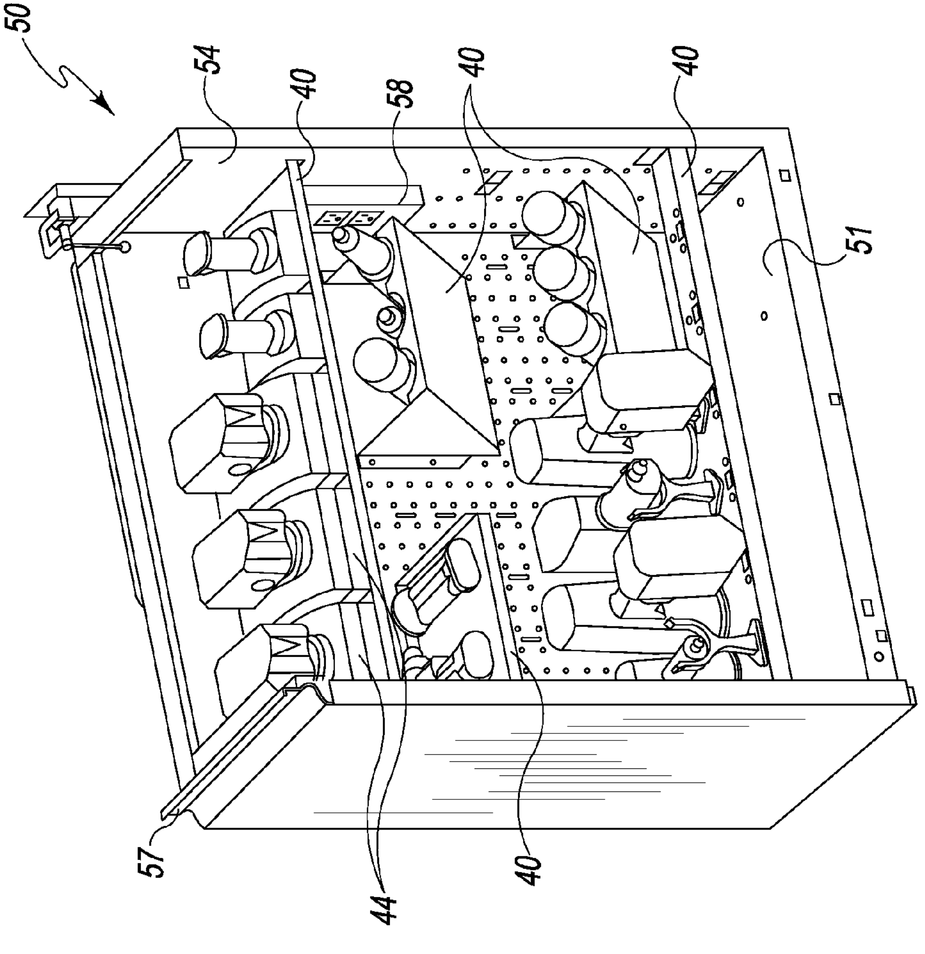
FIG. 8 is a perspective of one embodiment of a power drawer illustrating one possible configuration of shelving and outlets.
Figure 9:
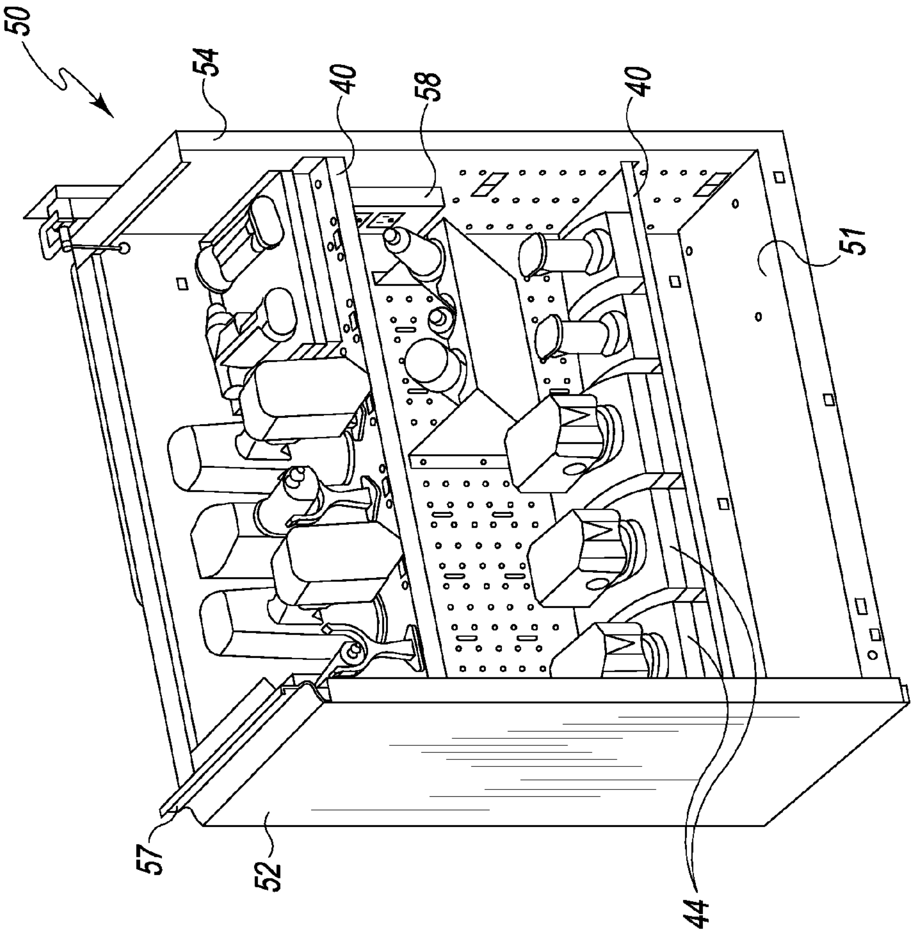
FIG. 9 is another perspective of a power drawer illustrating another possible configuration of shelving and outlets.

The exterior sidewall 53 is preferably provided with slots 36, as shown in FIG. 4, to allow attachment of custom shelves 40, shown for example in FIGS. 6, 8 and 9. The shelves 40 are preferably configured to support, for example, a battery charging unit 44 within the power drawer 50. Openings may also be provided on some or all shelves 40 as a holster for cordless tools, as illustrated. A plurality of such specially configured shelves 40 may be attached within drawer 50, if needed. The shelves 40 are preferably readily attachable and detachable to allow the power drawer 50 to be customized for the individual user.

As mentioned above, the storage unit 10 preferably has an inner wall 18 which blocks access to the interior compartment of the power drawer 50 when the drawer is in a closed position. The remaining space of the storage unit 10 may be configured in any manner known and used by those skilled in the art.

A lock 42 is preferably provided on the storage unit 10 such that the power drawer 50 may be locked in a closed position when desired. Alternatively, a lock (not shown) may be provided on the power drawer 50 itself to allow locking of the drawer 50 separate from the locking of the storage unit 10.

Referring now to FIGS. 1-3 and 10-12, two additional areas for placing power outlets can be readily understood. The top surface 16 of the storage unit 10 is a useful location for providing power. As with the power drawer 50 above, the power outlets may be configured as a strip or on a panel. While the referenced drawings illustrate the power strip 72 to be centered proximate a back edge of the top surface 16, it may be desirable have the strip 72 further from the computer hatch 80, for example.

In a preferred embodiment, the top surface 16 provides a work surface and includes a protruding power strip 72, having a plurality of power outlets 73. The strip 72, though extending from the top surface 16, does not significantly impede the full use of the work surface. Alternatively, the outlet strip 72 may be recessed within the top surface 16 to minimize any possible interference potential. In either case, a cover (either integral or detachable—not shown) may be used for the entire strip 72 or on each of the individual outlets 73 to prevent damage to the outlets 73—for example, from debris falling into the outlet openings—when the strip 16 is not in use.

Figure 10:
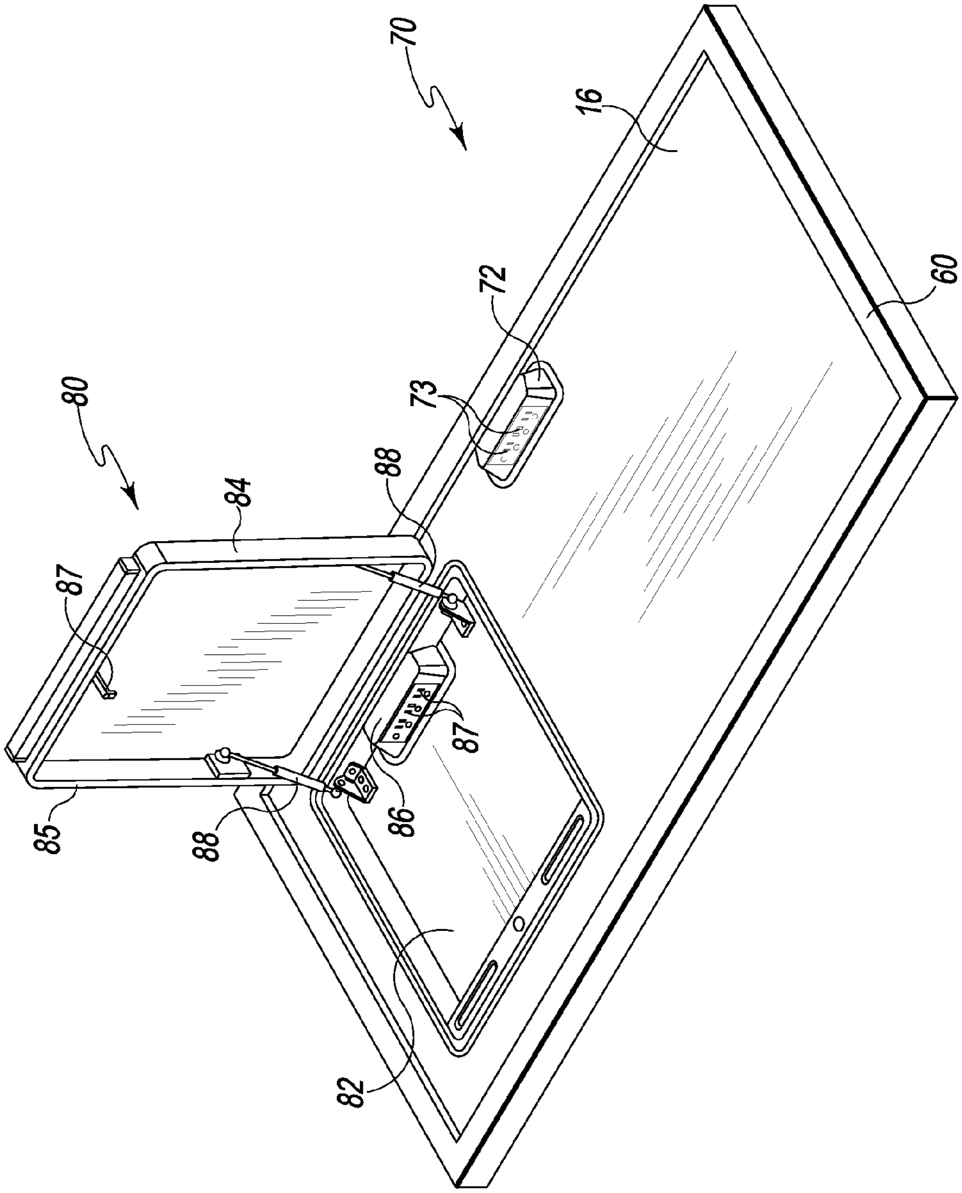
FIG. 10 is a perspective view of one embodiment of the tool storage cabinet top surface, including a computer hatch in an open position.
Figure 11:
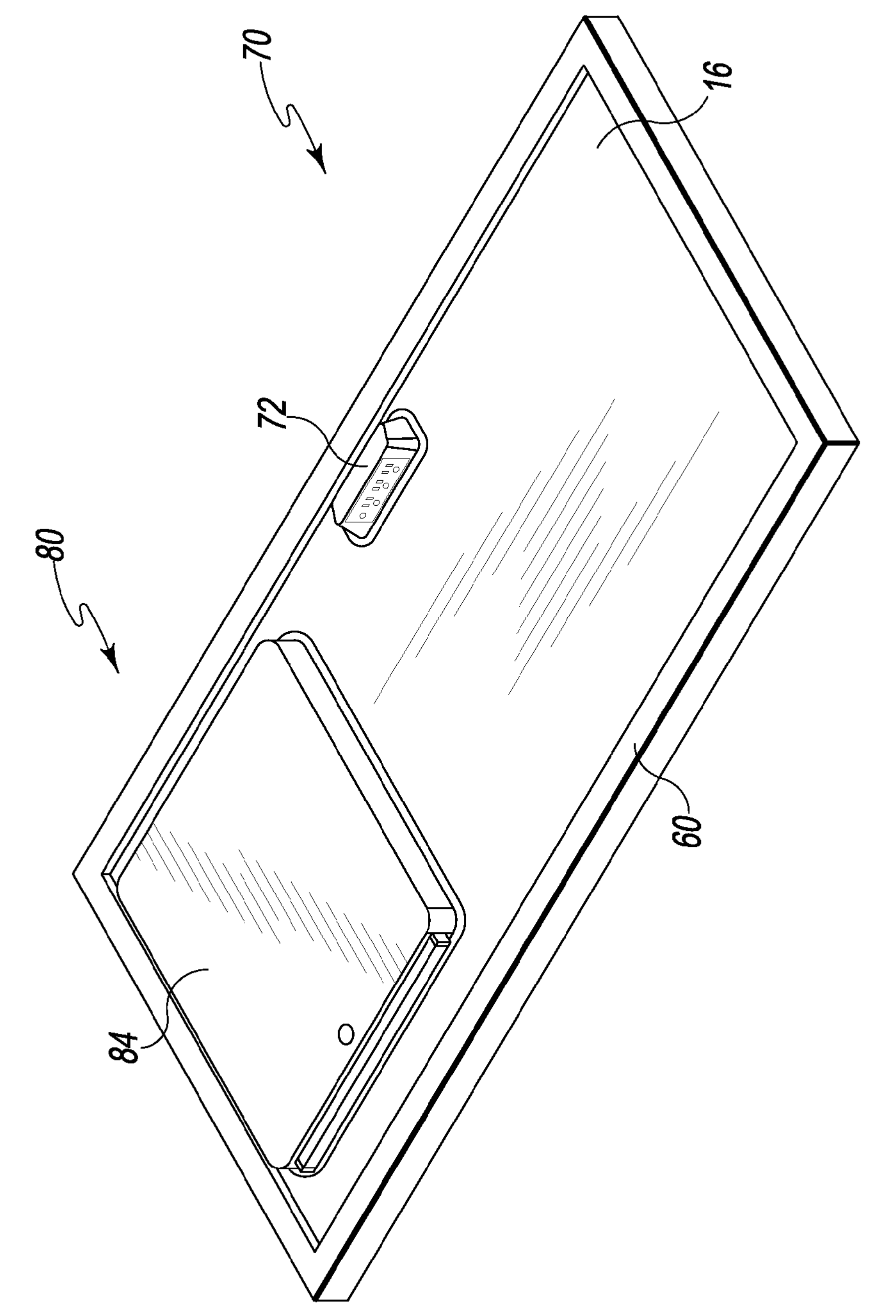
FIG. 11 is a perspective view similar to FIG. 10 showing the computer hatch in a closed position.
Figure 12:
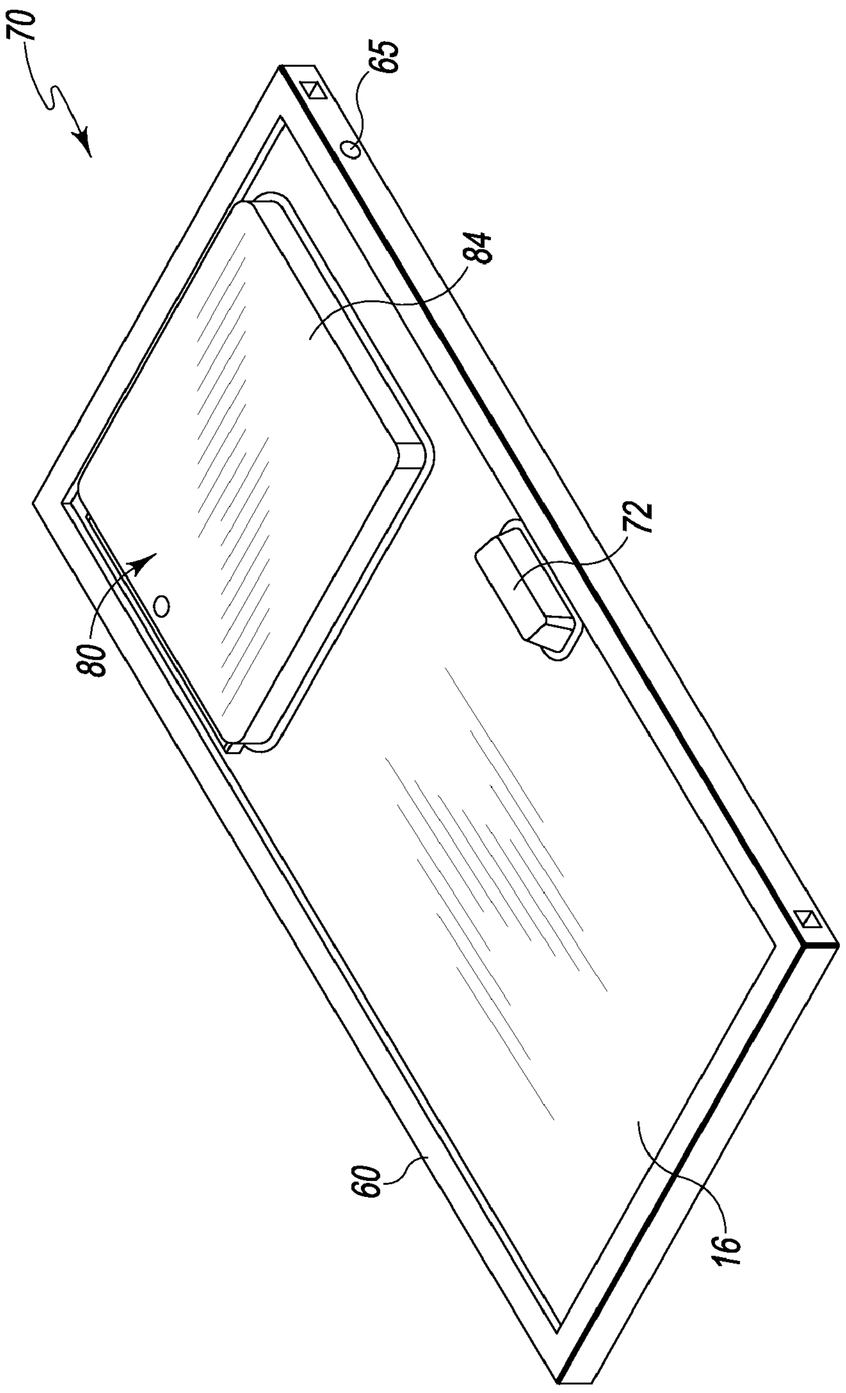
FIG. 12 is another perspective view of the tool storage cabinet top surface showing the back side.

The workstation surface, as shown in FIGS. 10-12, has a raised perimeter 60 to prevent tools and parts from rolling off the storage unit 10. The raised perimeter 60 provided may vary from a slight bump to a significant protrusion depending on the intended use. The raised perimeter 60 is preferably integral to the top surface 16, but may be a detachable feature or a permanently affixed added feature.

Referring to FIGS. 10-12, the top surface 16 of the unit 10 is also preferably equipped with a computer hatch 80, including a recessed compartment 82 and a closable hinged protective cover 84. The recessed compartment 82 is equipped with power via power strip 86 having a plurality of power outlets 87.

At least one integral power strip 86 is positioned in the recessed compartment 82. With respect to the hatch 80, the protective cover 84 includes a seal 85 at the perimeter to seal out dust and moisture when the cover 84 is closed (FIG. 11). Hinged along a back edge, the hatch 80 includes air springs 88 to assist opening and retention of the cover 84.

The recessed compartment 82 should be deep enough to house, e.g., a notebook computer, MODIS, or other diagnostic equipment. It may be desirable to provide a textured or rubberized surface (not shown) within compartment 82 to provide some level of cushioning for equipment and to help minimize lateral movement and vibration. A latch 87 or similar mechanism to hold the protective cover 84 closed is preferably used on the hatch 80 for security purposes. For further security, the latch 87 may include a locking feature (not shown) requiring a key, combination, code, biometric print, card swipe or the like to unlock.

While not shown in the appended drawings, it may be advantageous to provide a docking station within the recessed compartment 82. The docking station might include direct connection to peripheral devices (e.g., printer, additional monitor(s), etc.). The docking station may also provide additional USB slots or other type of ports for add-on peripherals.

Referring to FIG. 12, the back edge of the workstation surface is shown. A power cord receptacle 65 may be provided, from which point electricity is fed to the entire top surface 16 (i.e., to each power strip). Other attachment devices for adding, for example, lockers, shelving, or the like, may be included on the support frame 12 of storage unit 10.

A lock is preferably provided on the storage unit 10 such that compartments, possibly including the power surface 70, may be covered and locked when desired. Alternatively, a lock (not shown) may be provided on each compartment drawer or cabinet to allow locking of the individual compartments separate from the storage unit 10.

Each of the power strips described herein may be comprised of 110 VAC and/or 12 VDC to accommodate most power tools and charging units. A 220 VAC power outlet may be supplied in special circumstances.

The power strip, if 110 VAC, has a power cord (not shown) which extends from the power strip and can be plugged into, for example, a wall outlet or a gas generator. A cable carrier, as shown in FIG. 7 for the power drawer 50, may be used to protect the integrity of any power strip power cord where it may be flexed repeatedly. The cord which extends from the power strip 16 may exit the unit 10 at a back wall opening to allow it to be plugged into a power source, as previously mentioned, such as a wall outlet or gas generator. Obviously, with 12 VDC power, the power source (a battery) can be retained within the storage unit 10 or positioned near the storage unit 10 for easy connection.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A tool storage unit comprising:

a cabinet structure having a plurality of surfaces defining a first interior space;

a storage compartment defining a second interior space and an enclosure separate from the second interior space, the storage compartment configured to move between an open position extending from the first interior space and a closed position retracted within the first interior space;

a stationary compartment sidewall fixed within the first interior space and adjacent the storage compartment, the stationary component sidewall configured to prevent access to the second interior space from the first interior space when the storage compartment is in the closed position;

a plurality of power outlets positioned within the storage compartment and accessible from the second interior space;

a flexible cable carrier having a first portion and a second portion, the first portion attached to the cabinet structure and the second portion positioned within the enclosure, the first portion being substantially parallel to the second portion when the storage compartment is in at least one of the open and the closed positions, the flexible cable carrier configured to protect a cord extending from the storage compartment within the cabinet as the storage compartment is moved between the open position and the closed position; and a locking feature configured to secure the storage compartment in the closed position.

2. The tool storage unit of claim 1, wherein the storage compartment is a slidable drawer.

3. The tool storage unit of claim 1, further comprising:

a power cord extending through the flexible cable carrier, the power cord having a first end and a second end opposite the first end, the first end configured to couple to the plurality of power outlets and the second end configured to couple to a power source.

4. The tool storage unit of claim 1, wherein the plurality of power outlets comprise a power strip.

5. The tool storage unit of claim 1, further comprising a support removably attached to a sidewall of the storage compartment and accessible from the second interior space.

6. The tool storage unit of claim 5, wherein the support is a shelf configured to hold at least one of battery powered tools, batteries for the battery powered tools, and charging devices for the batteries.

7. The tool storage unit of claim 6, wherein the support is a shelf configured to retain a plurality of battery charging units plugged into the plurality of power outlets.

8. The tool storage unit of claim 1, wherein the storage compartment is vertically oriented having a sidewall panel with an area greater than an area of a bottom wall panel.

9. The tool storage unit of claim 1, wherein the storage compartment comprises front, rear and bottom wall panels and a single sidewall panel.

10. The tool storage unit of claim 9, wherein the plurality of power outlets are positioned on the rear wall panel.

11. The tool storage unit of claim 9, wherein the single sidewall panel comprises a plurality of slots.

12. The tool storage unit of claim 11, further comprising an adjustable support having tabs to detachably engage the slots and retain the support within the second interior space.

13. The tool storage unit of claim 9, further comprising an adjustable support detachably engaged to at least one of the front wall panel, the rear wall panel, the bottom wall panel, and the sidewall panel.

14. The tool storage unit of claim 1, further comprising a plurality of storage compartments positioned within the first interior space.

15. The tool storage unit of claim 14, wherein the plurality of storage compartments comprise sliding drawers.

16. A tool storage compartment slideably positioned within a tool storage cabinet to move between an open position and a closed position, the storage compartment comprising:

a front, a rear, and a bottom wall panel;

a single sidewall panel affixed to each of the front, rear and bottom wall panels, thereby defining an interior space;

a plurality of power outlets attached to at least one of the front, rear, bottom and sidewall panels and accessible from within the interior space;

a flexible cable carrier having a first portion and a second portion, the first portion attached to the tool storage cabinet and the second portion detached from the tool storage cabinet, the first portion being substantially parallel to the second portion when the storage compartment is in at least one of the open and the closed position, the flexible cable carrier configured to protect a cord extending from the storage compartment within the cabinet as the storage compartment is moved between the open position and the closed position.

17. The tool storage compartment of claim 16, further comprising:

a power cord extending through the flexible cable carrier, the power cord having a first cord end and a second cord end opposite the first cord end, the first cord end configured to couple to the plurality of power outlets and the second cord end configured to couple to a power source.

18. The tool storage compartment of claim 16, wherein the plurality of power outlets comprise a power strip.

19. The tool storage compartment of claim 16, further comprising a support removably attached to the sidewall and accessible from the interior space.

20. The tool storage compartment of claim 19, wherein the support is a shelf configured to hold at least one of battery powered tools, batteries, and charging devices.

21. The tool storage compartment of claim 16, wherein the single sidewall panel has an area greater than an area of a bottom wall panel.

22. The tool storage compartment of claim 21, wherein the single sidewall panel comprises a plurality of slots.

23. The tool storage unit of claim 22, further comprising an adjustable support having tabs configured to detachably engage the slots and retain the support within the interior space.

24. The tool storage unit of claim 16, further comprising an adjustable support detachably engaged to at least one of the front wall panel, the rear wall panel, the bottom wall panel, and the sidewall panel.

25. A tool storage unit comprising:

a cabinet structure including a back cabinet surface, a top cabinet surface, a bottom cabinet surface, and side cabinet surfaces affixed to each of said top, bottom, and back cabinet surfaces defining a first interior space;

a storage compartment having a front compartment surface, a back compartment surface, a bottom compartment surface, and a side compartment surface affixed to each of said front, back and bottom compartment surfaces defining a second interior space, at least one of said side, front, back and bottom compartment surfaces configured to receive a power outlet in said second interior space, said storage compartment slideably positioned within said first interior space of said cabinet structure and configured to move between an open position extending from said first interior space and a closed position retracted within said first interior space;

a flexible cable carrier having a first portion and a second portion, said first portion attached to said cabinet structure and said second portion detached from the cabinet structure, the first portion being substantially parallel to the second portion when the storage compartment is in at least one of the open and the closed position, said flexible cable carrier configured to protect a cord extending from said storage compartment as said storage compartment is moved between said open position and said closed position.

26. The tool storage unit of claim 25, further comprising:

a plurality of power outlets positioned within said second interior space and received in at least one of said side, front, back and bottom compartment surfaces; and a power cord extending through said flexible cable carrier, said power cord having a first cord end and a second cord end opposite said first cord end, said first cord end configured to couple to said plurality of power outlets positioned within said second interior space, said second cord end configured to couple to a power source.

27. The tool storage unit of claim 25, wherein said flexible cable carrier includes a plurality of articulating joints.

28. The tool storage unit of claim 25, wherein said flexible cable carrier includes an accordion structure configured to expand and contract as said storage compartment is moved between said open position and said closed position.

29. The tool storage unit of claim 25, wherein said flexible cable carrier is configured to fold back upon itself as said storage compartment is moved between said open position and said closed position.

* * * * *